(12) United States Patent
Pitt et al.

(10) Patent No.: US 8,942,743 B2
(45) Date of Patent: *Jan. 27, 2015

(54) IALERT ENHANCED ALERT MANAGER (75) Inventors: Lance D. Pitt, Kent, WA (US); Thomas Ginter, Bellevue, WA (US); Firdaus Aryana, Seattle, WA (US); Donald Le Roy Mitchell, Jr., Bellevue, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 193 days.

This patent is subject to a terminal disclaimer.

(21) Appl. No.: 13/338,978

(22) Filed: Dec. 28, 2011

(65) Prior Publication Data
US 2012/0157125 A1   Jun. 21, 2012

Related U.S. Application Data

(63) Continuation-in-part of application No. 13/064,796, filed on Apr. 15, 2011.

(60) Provisional application No. 61/457,145, filed on Jan. 14, 2011, provisional application No. 61/457,061, filed on Dec. 17, 2010, provisional application No. 61/457,744, filed on May 25, 2011.

(51) Int. Cl.
*H04W 4/00* (2009.01)
*H04W 4/02* (2009.01)
*H04W 4/22* (2009.01)

(52) U.S. Cl.
CPC ............... *H04W 4/021* (2013.01); *H04W 4/22* (2013.01)
USPC ....... 455/500; 455/41.2; 455/418; 455/404.2; 455/440; 455/456.1; 455/456.2

(58) Field of Classification Search
USPC ........ 455/41.2, 418, 404.2, 440, 456.1, 456.2
See application file for complete search history.

(56) References Cited

U.S. PATENT DOCUMENTS

| 1,103,073 A | 7/1914 | O'Connell |
| 4,445,118 A | 4/1984 | Taylor |

(Continued)

FOREIGN PATENT DOCUMENTS

| KR | WO/2006/07585 | 7/2006 |
| SE | WO99/21380 | 4/1999 |

(Continued)

OTHER PUBLICATIONS

International Search Report received in PCT/US2012/067857 dated Feb. 20, 2013.

(Continued)

*Primary Examiner* — Bobbak Safaipour
(74) *Attorney, Agent, or Firm* — William H. Bollman (57) ABSTRACT iAlert_Enhanced_Alert_Manager enables a user to register an interest in their current location, as well as persons, places and/or things in which the user holds some regard. The iAlert_Enhanced_Alert_Manager provides notification and clarifying information to user's devices concerning events/happenstance that have occurred or are likely to occur within a proximity of registered persons, places, and/or things. The iAlert_Enhanced_Alert_Manager comprises data structures (e.g. an Affinity Table, a SPIN table, a SPIN-List Table, an Affinity-List Table, and a Keyword-List Table) to manage affinities, Spheres of Influence (SPINs), and relationships therebetween that may positively or negatively induce a person. Timely notification of events/happenstance to a user comprises the computation of iEvent-vectors and iAlert-vectors. An iEvent-vector contains fields pertaining to events/happenstance whereas an iAlert-vector comprises information pertaining to notifications. Transmission of a notification is determined as a function of the magnitude of an event/happenstance and the proximity of an event/happenstance to registered objects of interest.

8 Claims, 7 Drawing Sheets

(56) References Cited

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,868,570 A | 9/1989 | Davis |
| 4,891,638 A | 1/1990 | Davis |
| 4,891,650 A | 1/1990 | Sheffer |
| 4,910,767 A | 3/1990 | Brugliera et al. |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Scheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,432,841 A | 7/1995 | Rimer |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,611,050 A | 3/1997 | Theimer |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van De Kerkhof |
| 5,682,600 A | 10/1997 | Salin |
| 5,689,245 A | 11/1997 | Noreen |
| 5,699,053 A | 12/1997 | Jonsson |
| 5,704,029 A | 12/1997 | Wright, Jr. |
| 5,721,781 A | 2/1998 | Deo |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vanttila |
| 5,797,094 A | 8/1998 | Houde |
| 5,797,096 A | 8/1998 | Lupien |
| 5,802,492 A | 9/1998 | DeLorrme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,835,907 A | 11/1998 | Newman |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seazholtz |
| 5,922,074 A | 7/1999 | Richard |
| 5,930,250 A | 7/1999 | Klok |
| 5,930,701 A | 7/1999 | Skog |
| 5,943,399 A | 8/1999 | Banister |
| 5,945,944 A | 8/1999 | Krasner |
| 5,946,629 A | 8/1999 | Sawyer |
| 5,946,630 A | 8/1999 | Willars |
| 5,950,130 A | 9/1999 | Coursey |
| 5,950,137 A | 9/1999 | Kim |
| 5,953,398 A | 9/1999 | Hill |
| 5,960,362 A | 9/1999 | Grob |
| 5,974,054 A | 10/1999 | Couts |

(56) References Cited

U.S. PATENT DOCUMENTS

| | | |
|---|---|---|
| 5,978,685 A | 11/1999 | Laiho |
| 5,983,099 A | 11/1999 | Yao |
| 5,987,323 A | 11/1999 | Huotari |
| 5,998,111 A | 12/1999 | Abe |
| 5,999,124 A | 12/1999 | Sheynblat |
| 6,014,602 A | 1/2000 | Kithol |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabash |
| 6,104,931 A | 8/2000 | Havinis |
| 6,108,533 A | 8/2000 | Brohoff |
| 6,121,923 A | 9/2000 | King |
| 6,122,503 A | 9/2000 | Daly |
| 6,122,520 A | 9/2000 | Want |
| 6,124,810 A | 9/2000 | Segal |
| 6,131,028 A | 10/2000 | Whittington |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos |
| 6,138,003 A | 10/2000 | Kingdon |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schneider |
| 6,178,506 B1 | 1/2001 | Quick, Jr. |
| 6,181,935 B1 | 1/2001 | Gossman |
| 6,181,939 B1 | 1/2001 | Ahvenainen |
| 6,188,354 B1 | 2/2001 | Soliman |
| 6,188,752 B1 | 2/2001 | Lesley |
| 6,188,909 B1 | 2/2001 | Alanara |
| 6,189,098 B1 | 2/2001 | Kaliski, Jr. |
| 6,195,555 B1 | 2/2001 | Dent |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Winbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feague |
| 6,249,680 B1 | 6/2001 | Wax |
| 6,249,744 B1 | 6/2001 | Morita |
| 6,249,873 B1 | 6/2001 | Richard |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,321,091 B1 | 11/2001 | Holland |
| 6,321,092 B1 | 11/2001 | Fitch |
| 6,321,257 B1 | 11/2001 | Kotola |
| 6,324,524 B1 | 11/2001 | Lent |
| 6,327,473 B1 | 12/2001 | Soliman |
| 6,327,479 B1 | 12/2001 | Mikkola |
| 6,330,454 B1 | 12/2001 | Verdonk |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,397,074 B1 | 5/2002 | Pihl |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,427,001 B1 | 7/2002 | Contractor |
| 6,429,808 B1 | 8/2002 | King |
| 6,433,734 B1 | 8/2002 | Krasner |
| 6,434,381 B1 | 8/2002 | Moore |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,553,236 B1 | 4/2003 | Dunko |
| 6,556,832 B1 | 4/2003 | Soliman |
| 6,560,456 B1 | 5/2003 | Lohtia |
| 6,560,461 B1 | 5/2003 | Fomukong |
| 6,560,534 B2 | 5/2003 | Abraham |
| 6,564,261 B1 | 5/2003 | Gudjonsson |
| 6,570,530 B2 | 5/2003 | Gaal |
| 6,571,095 B1 | 5/2003 | Koodli |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,593 B1 | 9/2003 | Drutman |
| 6,618,670 B1 | 9/2003 | Chansarkar |
| 6,621,452 B2 | 9/2003 | Knockeart |

(56) References Cited

U.S. PATENT DOCUMENTS

| | | |
|---|---|---|
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,650,288 B1 | 11/2003 | Pitt |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,675,017 B1 | 1/2004 | Zellner |
| 6,677,894 B2 | 1/2004 | Sheynblat |
| 6,680,694 B1 | 1/2004 | Knockheart |
| 6,680,695 B2 | 1/2004 | Turetzky |
| 6,687,504 B1 | 2/2004 | Raith |
| 6,690,940 B1 | 2/2004 | Brown |
| 6,691,019 B2 | 2/2004 | Seeley |
| 6,694,258 B2 | 2/2004 | Johnson |
| 6,694,351 B1 | 2/2004 | Shaffer |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,396 B2 | 4/2004 | Chin |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,757,545 B2 | 6/2004 | Nowak |
| 6,771,742 B2 | 8/2004 | McCalmont |
| 6,771,971 B2 | 8/2004 | Smith |
| 6,772,340 B1 | 8/2004 | Peinado |
| 6,775,255 B1 | 8/2004 | Roy |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McCraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermeijden |
| 6,807,534 B1 | 10/2004 | Erickson |
| 6,810,323 B1 | 10/2004 | Bullock |
| 6,813,264 B2 | 11/2004 | Vassilovski |
| 6,813,499 B2 | 11/2004 | McDonnell |
| 6,813,560 B2 | 11/2004 | Van Diggelen |
| 6,816,111 B2 | 11/2004 | Krasner |
| 6,816,580 B2 | 11/2004 | Timmins |
| 6,816,710 B2 | 11/2004 | Krasner |
| 6,816,719 B1 | 11/2004 | Heinonen |
| 6,816,734 B2 | 11/2004 | Wong |
| 6,820,069 B1 | 11/2004 | Kogan |
| 6,829,475 B1 | 12/2004 | Lee |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,842,715 B1 | 1/2005 | Gaal |
| 6,847,618 B2 | 1/2005 | Laursen |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,876,734 B1 | 4/2005 | Summers |
| 6,882,850 B2 | 4/2005 | McConnell et al. |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,940,826 B1 | 9/2005 | Simard |
| 6,940,950 B2 | 9/2005 | Dickinson et al. |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,044 B2 | 11/2005 | Beason |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohles |
| 6,985,747 B2 | 1/2006 | Chithambaram |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rousseau |
| 7,110,773 B1 | 9/2006 | Wallace |
| 7,123,874 B1 | 10/2006 | Brennan |
| 7,136,466 B1 | 11/2006 | Gao |
| 7,136,838 B1 | 11/2006 | Peinado |
| 7,145,900 B2 | 12/2006 | Nix |
| 7,151,946 B2 | 12/2006 | Maggenti |
| 7,174,153 B2 | 2/2007 | Ehlers |
| 7,177,397 B2 | 2/2007 | McCalmont |
| 7,177,398 B2 | 2/2007 | Meer |

(56) References Cited

U.S. PATENT DOCUMENTS

| | | |
|---|---|---|
| 7,177,399 B2 | 2/2007 | Dawson |
| 7,200,380 B2 | 4/2007 | Havlark |
| 7,209,758 B1 | 4/2007 | Moll et al. |
| 7,209,969 B2 | 4/2007 | Lahti |
| 7,218,940 B2 | 5/2007 | Niemenmaa |
| 7,221,959 B2 | 5/2007 | Lindqvist |
| 7,245,900 B1 | 7/2007 | Lamb |
| 7,246,187 B1 | 7/2007 | Ezra |
| 7,260,186 B2 | 8/2007 | Zhu |
| 7,260,384 B2 | 8/2007 | Bales et al. |
| 7,277,938 B2 | 10/2007 | Duimovich |
| 7,302,582 B2 | 11/2007 | Snapp |
| 7,321,773 B2 | 1/2008 | Hines |
| 7,330,899 B2 | 2/2008 | Wong |
| 7,333,480 B1 | 2/2008 | Clarke |
| 7,369,508 B2 | 5/2008 | Parantainen |
| 7,369,530 B2 | 5/2008 | Keagy |
| 7,382,773 B2 | 6/2008 | Schoeneberger |
| 7,392,240 B2 | 6/2008 | Scriffignano |
| 7,394,896 B2 | 7/2008 | Norton |
| 7,428,571 B2 | 9/2008 | Ichimura |
| 7,436,785 B1 | 10/2008 | McMullen |
| 7,440,442 B2 | 10/2008 | Grabelsky et al. |
| 7,444,342 B1 | 10/2008 | Hall |
| 7,450,951 B2 | 11/2008 | Vimpari |
| 7,471,236 B1 | 12/2008 | Pitt |
| 7,522,182 B2 | 4/2009 | Bang |
| 7,573,982 B2 | 8/2009 | Breen |
| 7,602,886 B1 | 10/2009 | Beech |
| 7,623,447 B1 | 11/2009 | Faccin |
| 7,711,094 B1 | 5/2010 | Olshansky |
| 7,764,961 B2 | 7/2010 | Zhu |
| 7,783,297 B2 | 8/2010 | Ishii |
| 7,787,611 B1 | 8/2010 | Kotelly |
| 7,822,391 B1 | 10/2010 | Delker |
| 7,822,871 B2 | 10/2010 | Stolorz |
| 7,825,780 B2 | 11/2010 | Pitt |
| 7,881,233 B2 | 2/2011 | Bieselin |
| 7,937,067 B2 | 5/2011 | Maier |
| 8,200,291 B2 | 6/2012 | Steinmetz |
| 8,688,087 B2 * | 4/2014 | Pitt et al. .................... 455/414.2 |
| 2001/0011247 A1 | 8/2001 | O'Flaherty |
| 2001/0040886 A1 | 11/2001 | Jimenez |
| 2001/0049274 A1 | 12/2001 | Degraeve |
| 2002/0002036 A1 | 1/2002 | Uehara |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069079 A1 | 6/2002 | Vega |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086676 A1 | 7/2002 | Hendrey |
| 2002/0098832 A1 | 7/2002 | Fleischer |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0126656 A1 | 9/2002 | Park |
| 2002/0138650 A1 | 9/2002 | Yamamoto |
| 2002/0147023 A1 | 10/2002 | Sawada |
| 2002/0156732 A1 | 10/2002 | Odijk |
| 2002/0158777 A1 | 10/2002 | Flick |
| 2002/0164998 A1 | 11/2002 | Younis |
| 2002/0173317 A1 | 11/2002 | Nykanen |
| 2002/0174073 A1 | 11/2002 | Nordman |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0016804 A1 | 1/2003 | Sheha |
| 2003/0026245 A1 | 2/2003 | Ejzak |
| 2003/0037163 A1 | 2/2003 | Kitada |
| 2003/0040272 A1 | 2/2003 | Lelievre |
| 2003/0044654 A1 | 3/2003 | Holt |
| 2003/0063730 A1 | 4/2003 | Woodring |
| 2003/0065788 A1 | 4/2003 | Salomaki |
| 2003/0072318 A1 | 4/2003 | Lam |
| 2003/0078064 A1 | 4/2003 | Chan |
| 2003/0081557 A1 | 5/2003 | Mettala |
| 2003/0086422 A1 | 5/2003 | Klinker et al. |
| 2003/0086539 A1 | 5/2003 | McCalmont |
| 2003/0100320 A1 | 5/2003 | Ranjan |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0118160 A1 | 6/2003 | Holt |
| 2003/0119521 A1 | 6/2003 | Tipnis |
| 2003/0119528 A1 | 6/2003 | Pew |
| 2003/0125042 A1 | 7/2003 | Olrik |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0163483 A1 | 8/2003 | Zingher et al. |
| 2003/0169881 A1 | 9/2003 | Niedermeyer |
| 2003/0186709 A1 | 10/2003 | Rhodes |
| 2003/0187803 A1 | 10/2003 | Pitt |
| 2003/0196105 A1 | 10/2003 | Fineberg |
| 2003/0204640 A1 | 10/2003 | Sahinoja |
| 2003/0223381 A1 | 12/2003 | Schroderus |
| 2004/0002326 A1 | 1/2004 | Maher |
| 2004/0032485 A1 | 2/2004 | Stephens |
| 2004/0043775 A1 | 3/2004 | Kennedy |
| 2004/0044623 A1 | 3/2004 | Wake |
| 2004/0047461 A1 | 3/2004 | Weisman |
| 2004/0068724 A1 | 4/2004 | Gardner |
| 2004/0070515 A1 | 4/2004 | Burkley |
| 2004/0077359 A1 | 4/2004 | Bernas |
| 2004/0078694 A1 | 4/2004 | Lester |
| 2004/0092250 A1 | 5/2004 | Valloppillil |
| 2004/0098497 A1 | 5/2004 | Banet |
| 2004/0107143 A1 | 6/2004 | Niemi |
| 2004/0132465 A1 | 7/2004 | Mattila |
| 2004/0150518 A1 | 8/2004 | Phillips |
| 2004/0152493 A1 | 8/2004 | Phillips |
| 2004/0181689 A1 | 9/2004 | Kiyoto |
| 2004/0184584 A1 | 9/2004 | McCalmont |
| 2004/0185875 A1 | 9/2004 | Diacakis |
| 2004/0190497 A1 | 9/2004 | Knox |
| 2004/0198332 A1 | 10/2004 | Lundsgaard |
| 2004/0198386 A1 | 10/2004 | Dupray |
| 2004/0203876 A1 | 10/2004 | Drawert |
| 2004/0203922 A1 | 10/2004 | Hines |
| 2004/0205151 A1 | 10/2004 | Sprigg |
| 2004/0209594 A1 | 10/2004 | Naboulsi |
| 2004/0229632 A1 | 11/2004 | Flynn |
| 2004/0235493 A1 | 11/2004 | Ekerborn |
| 2004/0242238 A1 | 12/2004 | Wang |
| 2004/0267445 A1 | 12/2004 | De Luca |
| 2005/0003797 A1 | 1/2005 | Baldwin |
| 2005/0028034 A1 | 2/2005 | Gantman |
| 2005/0030977 A1 | 2/2005 | Casey |
| 2005/0039178 A1 | 2/2005 | Marolia |
| 2005/0041578 A1 | 2/2005 | Huotari |
| 2005/0043037 A1 | 2/2005 | Ioppe |
| 2005/0053209 A1 | 3/2005 | D'Evelyn |
| 2005/0071251 A1 | 3/2005 | Linden |
| 2005/0071671 A1 | 3/2005 | Karaoguz |
| 2005/0074107 A1 | 4/2005 | Renner |
| 2005/0083911 A1 | 4/2005 | Grabelsky |
| 2005/0086467 A1 | 4/2005 | Asokan |
| 2005/0090236 A1 | 4/2005 | Schwinke |

(56) References Cited

U.S. PATENT DOCUMENTS

| | | |
|---|---|---|
| 2005/0107673 A1 | 5/2005 | Ball |
| 2005/0112030 A1 | 5/2005 | Gaus |
| 2005/0119012 A1 | 6/2005 | Merheb |
| 2005/0125376 A1* | 6/2005 | Curtis et al. ............... 707/1 |
| 2005/0134504 A1 | 6/2005 | Harwood |
| 2005/0135569 A1 | 6/2005 | Dickinson et al. |
| 2005/0136885 A1 | 6/2005 | Kaltsukis |
| 2005/0148346 A1 | 7/2005 | Maloney |
| 2005/0149430 A1 | 7/2005 | Williams |
| 2005/0169248 A1 | 8/2005 | Truesdale |
| 2005/0174991 A1 | 8/2005 | Keagy |
| 2005/0186937 A1 | 8/2005 | Graham |
| 2005/0190892 A1 | 9/2005 | Dawson |
| 2005/0192822 A1 | 9/2005 | Hartenstein |
| 2005/0201358 A1 | 9/2005 | Nelson |
| 2005/0201529 A1 | 9/2005 | Nelson |
| 2005/0209995 A1 | 9/2005 | Aksu |
| 2005/0213716 A1 | 9/2005 | Zhu |
| 2005/0215233 A1 | 9/2005 | Perera |
| 2005/0216300 A1 | 9/2005 | Appelman |
| 2005/0232252 A1 | 10/2005 | Hoover |
| 2005/0238156 A1 | 10/2005 | Turner |
| 2005/0250516 A1 | 11/2005 | Shim |
| 2005/0259675 A1 | 11/2005 | Tuohino |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0010200 A1 | 1/2006 | Mousseau |
| 2006/0020424 A1* | 1/2006 | Quindel ............... 702/183 |
| 2006/0023747 A1 | 2/2006 | Koren et al. |
| 2006/0026288 A1 | 2/2006 | Acharya |
| 2006/0036680 A1 | 2/2006 | Shim |
| 2006/0053225 A1 | 3/2006 | Poikselka |
| 2006/0058042 A1 | 3/2006 | Shim |
| 2006/0058045 A1 | 3/2006 | Nilsen |
| 2006/0058102 A1 | 3/2006 | Nguyen et al. |
| 2006/0068753 A1 | 3/2006 | Karpen |
| 2006/0079249 A1 | 4/2006 | Shim |
| 2006/0104306 A1 | 5/2006 | Adamczyk |
| 2006/0106774 A1 | 5/2006 | Cohen |
| 2006/0120517 A1 | 6/2006 | Moon |
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0206610 A1 | 9/2006 | Ling |
| 2006/0212558 A1 | 9/2006 | Sahinoja |
| 2006/0212562 A1 | 9/2006 | Kushwaha |
| 2006/0225090 A1 | 10/2006 | Shim et al. |
| 2006/0234639 A1 | 10/2006 | Kushwaha |
| 2006/0234698 A1 | 10/2006 | Fok |
| 2006/0239205 A1 | 10/2006 | Warren |
| 2006/0258380 A1 | 11/2006 | Liebowitz |
| 2006/0293024 A1 | 12/2006 | Benco |
| 2006/0293066 A1 | 12/2006 | Edge |
| 2007/0003024 A1 | 1/2007 | Olivier |
| 2007/0019614 A1 | 1/2007 | Hoffmann |
| 2007/0022011 A1 | 1/2007 | Altberg |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0036139 A1 | 2/2007 | Patel |
| 2007/0037585 A1 | 2/2007 | Shim |
| 2007/0041513 A1 | 2/2007 | Gende |
| 2007/0049288 A1 | 3/2007 | Lamprecht |
| 2007/0060097 A1 | 3/2007 | Edge |
| 2007/0072624 A1 | 3/2007 | Niemenmaa |
| 2007/0081635 A1 | 4/2007 | Croak |
| 2007/0082681 A1 | 4/2007 | Kim |
| 2007/0082682 A1 | 4/2007 | Kim |
| 2007/0115941 A1 | 5/2007 | Patel |
| 2007/0121601 A1 | 5/2007 | Kikinis |
| 2007/0149213 A1 | 6/2007 | Lamba |
| 2007/0160036 A1 | 7/2007 | Smith |
| 2007/0162228 A1 | 7/2007 | Mitchell |
| 2007/0167177 A1 | 7/2007 | Kraufvelin |
| 2007/0182547 A1 | 8/2007 | Wachter |
| 2007/0182631 A1 | 8/2007 | Berlinsky |
| 2007/0201623 A1 | 8/2007 | Hines |
| 2007/0206568 A1 | 9/2007 | Silver |
| 2007/0206613 A1 | 9/2007 | Silver |
| 2007/0242660 A1 | 10/2007 | Xu |
| 2007/0243885 A1 | 10/2007 | Shim |
| 2007/0263610 A1 | 11/2007 | Mitchell |
| 2007/0263611 A1 | 11/2007 | Mitchell |
| 2007/0270164 A1 | 11/2007 | Maier |
| 2008/0032703 A1 | 2/2008 | Krumm |
| 2008/0037715 A1 | 2/2008 | Prozeniuk |
| 2008/0063153 A1 | 3/2008 | Krivorot |
| 2008/0065775 A1 | 3/2008 | Polk |
| 2008/0109650 A1 | 5/2008 | Shim |
| 2008/0117859 A1 | 5/2008 | Shahidi |
| 2008/0160953 A1 | 7/2008 | Mia |
| 2008/0186164 A1 | 8/2008 | Emigh |
| 2008/0192731 A1 | 8/2008 | Dickinson |
| 2008/0208671 A1 | 8/2008 | Ehrlich |
| 2008/0214202 A1 | 9/2008 | Toomey |
| 2008/0268769 A1 | 10/2008 | Brown |
| 2009/0029675 A1 | 1/2009 | Steinmetz |
| 2009/0198733 A1 | 8/2009 | Gounares |
| 2009/0204471 A1 | 8/2009 | Elenbaas et al. |
| 2009/0204600 A1 | 8/2009 | Kalik |
| 2009/0237210 A1 | 9/2009 | Ciesla |
| 2010/0010860 A1 | 1/2010 | Bose |
| 2010/0021013 A1 | 1/2010 | Gale |
| 2010/0138400 A1* | 6/2010 | Curtis et al. ............... 707/706 |
| 2010/0161662 A1* | 6/2010 | Jonas et al. ............... 707/780 |
| 2010/0167691 A1 | 7/2010 | Howarter |
| 2010/0198933 A1 | 8/2010 | Smith |
| 2010/0233991 A1 | 9/2010 | Crawford |
| 2010/0241507 A1* | 9/2010 | Quinn et al. ............... 705/14.42 |
| 2010/0262668 A1 | 10/2010 | Piett |
| 2011/0109468 A1 | 5/2011 | Hirschfeld |
| 2011/0113060 A1 | 5/2011 | Martini |
| 2011/0137549 A1 | 6/2011 | Gupta |
| 2011/0151837 A1 | 6/2011 | Winbush |
| 2011/0207429 A1 | 8/2011 | Maier |
| 2012/0079600 A1 | 3/2012 | Kellerman |
| 2012/0157136 A1* | 6/2012 | Pitt et al. ............... 455/500 |
| 2013/0079152 A1* | 3/2013 | Hall ............... 463/42 |

FOREIGN PATENT DOCUMENTS

| | | |
|---|---|---|
| WO | WO00/40038 | 12/1999 |
| WO | WO01/45342 | 6/2001 |
| WO | WO02/057869 | 7/2002 |
| WO | WO2004/025941 | 3/2004 |
| WO | WO2005/051033 | 6/2005 |
| WO | WO2007/027166 | 6/2005 |
| WO | WO2007/025227 | 3/2007 |
| WO | WO2009/105603 | 8/2009 |

OTHER PUBLICATIONS

International Search Report received in PCT/US2012/67689 dated Feb. 22, 2013.

International Search Report received in PCT/US2012/066313 dated Feb. 4, 2013.

International Search Report received in PCT/US2012/067932 dated Feb. 6, 2013.

International Search Report received in PCT/US2012/00266 dated Aug. 3, 3012.

International Search Report received in PCT/US2011/001990 dated Apr. 24, 2012.

Intrado Inc., Qwest Detailed SR/ALI to MPC/GMLC Interface Specification for TCP/IP Implementation of TIA/EIA/J-STD-036-E2 with Phase I Location Description Addition, Intrado Informed Response; Apr. 2004; Issue 1.11; pp. 1-57.

(56) References Cited

OTHER PUBLICATIONS

International Search Report in PCT/US2007/23243 dated Apr. 2, 2008.

PCT International Search Report (PCTUS2007/23714) and Written Opinion of International Searching Authority, Apr. 18, 2008.

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

Location Based Services V2 Roaming Support (non proprietary), 80-V8470-2NP A, dated Jan. 27, 2005, pp. 1-56.

Yilin Zhao, Efficient and reliable date transmission for cellular and GPS based mayday systems, Nov. 1997, IEEE, IEEE Conference on Intelligent Transportation System, 1997. ITSC 97, 555-559.

Qualcomm CDMA Technologies, LBS Control Plane/Use Plane Overview—80-VD378-1NP B, 2006, pp. 1-36.

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

Mike McMullen, Sprint, LBS Roaming Summit, Sep. 19, 2006.

Andrew Yeow, BCE, LBS Roaming Summit, Sep. 19, 2006, pp. 1-8.

Nars Haran, U.S. Cellular, Packet Data—Roaming and LBS Overview, Nov. 2, 2007, pp. 1-15.

Qualcomm CDMA Technologies, LBS Control Plane Roaming—80-VD377-1NP A, 2006, pp. 1-10.

Qualcomm CDMA Technologies, MS Resident User Plane LBS Roaming—80-VC718-1 E, 2006, pp. 1-37.

Intrado MSAG Prep for E911 Program and Documentation. Intrado Inc., Longmont, CO. Sep. 14, 2006. Accessed: Nov. 8, 2011. Idaho PSAP Standards Committee. Idaho Emergency Communications Commission,http://idahodispatch.com/index.php?option=com_documan&task=doc_download&gid=3&Itemid=7.

\* cited by examiner

FIG. 3 iEvent-vector table

| iEvent ID (primary key) | Event_Type | Magnitude (enumeration) | Centroid_X | Centroid_Y | Centroid_Z | Area_of_Effect_Radius (for quick evaluation) | Shape_Type (enumeration) | Angle of Rotation | Angular Extent | Disti2foci-A | Disti2foci-B | Primary_Length | Secondary_Length (optional) |
|---|---|---|---|---|---|---|---|---|---|---|---|---|---|
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |

| SPIN ID (Primary Key) | Lat | Lon | Primary X | Primary Y | Primary Z | Precord_Ptr | Secondary X | Secondary Y | Secondary Z | Srecord_Ptr | Tertiary X | Tertiary Y | Tertiary Z | Trecord_Ptr | Quaternay X | Quaternay Y | Quaternay Z | Qrecord_Ptr | Time Tag |
|---|---|---|---|---|---|---|---|---|---|---|---|---|---|---|---|---|---|---|---|
| | | | | | | | | | | | | | | | | | | | |
| | | | | | | | | | | | | | | | | | | | |
| | | | | | | | | | | | | | | | | | | | |
| | | | | | | | | | | | | | | | | | | | |
| | | | | | | | | | | | | | | | | | | | |
| | | | | | | | | | | | | | | | | | | | |
| | | | | | | | | | | | | | | | | | | | |
| | | | | | | | | | | | | | | | | | | | |
| | | | | | | | | | | | | | | | | | | | |
| | | | | | | | | | | | | | | | | | | | |
| | | | | | | | | | | | | | | | | | | | |

LOC Table

FIG. 7

IALERT ENHANCED ALERT MANAGER

The present application claims priority from U.S. Provisional 61/457,744, entitled "iALERT ENHANCED ALERT MANAGER" to Pitt, Ginter, Aryana, and Mitchell, filed May 25, 2011; and is a continuation-in-part of U.S. application Ser. No. 13/064,796, entitled "N-Dimensional Affinity Confluencer" to Pitt, Ginter, Hines, Burton and Ramberg, filed Apr. 15, 2011, the entirety of both of which are explicitly incorporated herein by reference.

BACKGROUND OF THE INVENTION

1. Field of the Invention

This invention relates generally to telecommunications. More particularly, it relates to wireless based technologies.

2. Background of Related Art

The present inventors have appreciated that there are a wide variety of events and happenstance that a person might benefit from knowing about, either before the event happens or very shortly after the event happens. For instance, persons near significant events (e.g. vehicle collisions, natural catastrophes, fires, etc.) may otherwise have no direct need to be notified of the simple occurrence of the event, but may very much like to get clarification of the nature of the event. Persons near less obvious events and happenstance (e.g. one's neighbor just dialed 9-1-1) may want to receive both notification of the event/happenstance as well as information clarifying the nature of the event/happenstance.

There is a need for persons to receive notification and clarifying information about events and happenstance that occur at a distance from a person if the event has significant enough area of effect (e.g. volcanic eruption), and/or if the event is within close enough proximity to someone about whom the person cares, and/or if the event is within close enough proximity to something about which the person holds some regard.

SUMMARY OF THE INVENTION

In accordance with the principles of the present invention, a method of providing notification to a wireless device regarding an event with an area of effect that encompasses said wireless device, or a list of alternate wireless devices pre-designated by the subscriber to whom said wireless device belongs, or a list of places (i.e. locations) pre-designated by the subscriber to whom said wireless device belongs; said list of wireless device and alternate wireless devices and locations constituting an affinity group. A sphere of influence (SPIN) is defined around each wireless device. Every event constitutes a plane of interaction that may or may not intersect these SPINs; said intersection depending on the event's area of effect. An affinity confluence is recognized between each and every event that intersects (i.e. encompasses) one or more constituent components of an affinity group (i.e. location of an identified wireless device or location of a designated place). Affinity confluence is evaluated and recognized for every affinity group. Recognition of affinity confluence stimulates a relevant notification to be initiated to the subscriber's wireless device.

BRIEF DESCRIPTION OF THE DRAWINGS

Features and advantages of the present invention become apparent to those skilled in the art from the following description with reference to the drawings, in which.

DETAILED DESCRIPTION OF ILLUSTRATIVE EMBODIMENTS

In accordance with the principles of the present invention, a method and system is provided to notify a wireless device about events/happenstance that have occurred within proximity of persons, places, and/or things in which a user has registered an interest. The system comprises a sentinel service provided by a suitable alert manager, e.g., an iAlert_Enhanced_Alert_Manager in a physical server device in communication with the wireless device.

A person with a mobile device may define a Sphere of Influence (SPIN) through which a multitude of planes of interaction pass and occasionally intersect. The intersection of planes of affinity within that person's Sphere of Influence (SPIN) constitutes a confluence of affinity that may either positively induce a person (attractive inducement) or negatively induce a person (repulsive inducement).

In accordance with the principles of the present invention, the sentinel service provided by the iAlert_Enhanced_Alert_Manager comprises data structures to manage affinities, Spheres of Influence (SPINS), and the identification of relationships therebetween. Five exemplary data structures maintained in the sentinel service include an Affinity Table, a Keyword-List Table, a SPIN Table, a SPIN-List Table, and an Affinity-List Table. Transmission of a notification to an iAlert user's device concerning a particular event/happenstance, in accordance with the principles of the present invention, is determined as a function of both the magnitude of the event/happenstance and the proximity of the event/happenstance to persons, places and/or things that an iAlert user has pre-designated as "important."

Timely notification of events/happenstance to a user's mobile device comprises the computation of a multitude of iEvent-vectors and iAlert-vectors, in accordance with the principles of the present invention. An iEvent-vector comprises information pertaining to a particular event/happenstance whereas an iAlert-vector comprises information pertaining to notifications regarding events/happenstance.

In accordance with another aspect of the present invention, a method and system enables a user to query the iAlert_Enhanced_Alert_Manager regarding the current state of a wireless device associated with a person, place, or thing in which the user has registered an interest. The current state of one to many vectors is assessed of either positive (i.e. attractive inducement) or negative (i.e. repulsive inducement) affinity.

The sentinel service may also notify a user's wireless device regarding events/happenstance that have not yet occurred but are deemed likely to occur within a parametrically defined proximity of persons, places, and/or things associated with respective wireless devices, and in which the user has identified an interest, in accordance with yet another aspect of the present invention.

In yet another embodiment of the present invention, timely evaluation of notifications to a user's wireless device is accomplished with a geographically defined nexus ("GeoNEXUS") and a four (4) tier data structure representing the location of iAlert-vectors and iEvent-vectors. GeoNEXUS rapidly identifies all iAlert-vectors within a predefined/preconfigured close proximity to an iEvent-vector, to assist in the timely transmission of notifications to users, regarding relevant events and happenstance.

The present invention describes a method and system that notifies one or more wireless devices, hereafter referred to as party-A, about events and happenstance that a user has registered an interest in. The present invention also describes a method and system to warn wireless devices of events that are likely to occur. The need for notification is determined as a function of both the magnitude of the event/happenstance and the proximity of the event/happenstance to wireless devices associated with persons, places, and/or things pre-designated by party-A as "important".

The present invention additionally describes a method and system by which wireless devices such as Party-A can query the iAlert_Enhanced_Alert Manager to assess the current state of one to many vectors of either positive (i.e. attractive inducement) or negative (i.e. repulsive inducement) affinity pertaining to pre-designated wireless devices associated with persons, places, and/or things.

First, the present invention allows Party-A to define persons, places, and/or things about which Party-A has a vested interest. Designation of persons, places, and/or things can be accomplished via various methods, including, but not limited to, calling a service center represented by either a human call-taker or an Interactive Voice Response (IVR) system, sending an activation SMS short message, sending an activation Email, or interacting with a full featured Internet web site.

Persons are identified by a mobile identification number corresponding to a phone that the person of interest is likely carrying. Mobile identification numbers used to identify individuals include, but are not limited to, cellular phone numbers, LTE phone numbers, and nomadic/mobile Voice over IP (VoIP) phone numbers. A list of examples of mobile identification numbers would include, but not be limited to, Radio Frequency Identifier [RFID], Electronic Serial Number [ESN], Mobile Identification Number [MIN], Mobile Directory Number [MDN], International Mobile Subscriber Identity [IMSI], International Mobile Equipment Identity [IMEI], Mobile Equipment Identifier [MEID], and Mobile Subscriber ISDN Number [MSISDN].

Places are identified by location, including, but not limited to, a valid postal address, a Master Street Address Guide (MSAG) record, or a latitude/longitude pair.

Things are identified by Radio Frequency Identifier (RFID) (e.g. LoJack Tag Number) or by location, including, but not limited to, a valid postal address, a Master Street Address Guide (MSAG) record, or a latitude/longitude pair. A latitude/longitude pair for an object may be attained using built-in GPS/GLONASS/GALILEO/GNSS receiver technology. Alternatively, if a mobile device is used to activate the sentinel service, then a latitude/longitude pair identifying an object may be recorded during activation.

Figure 1:
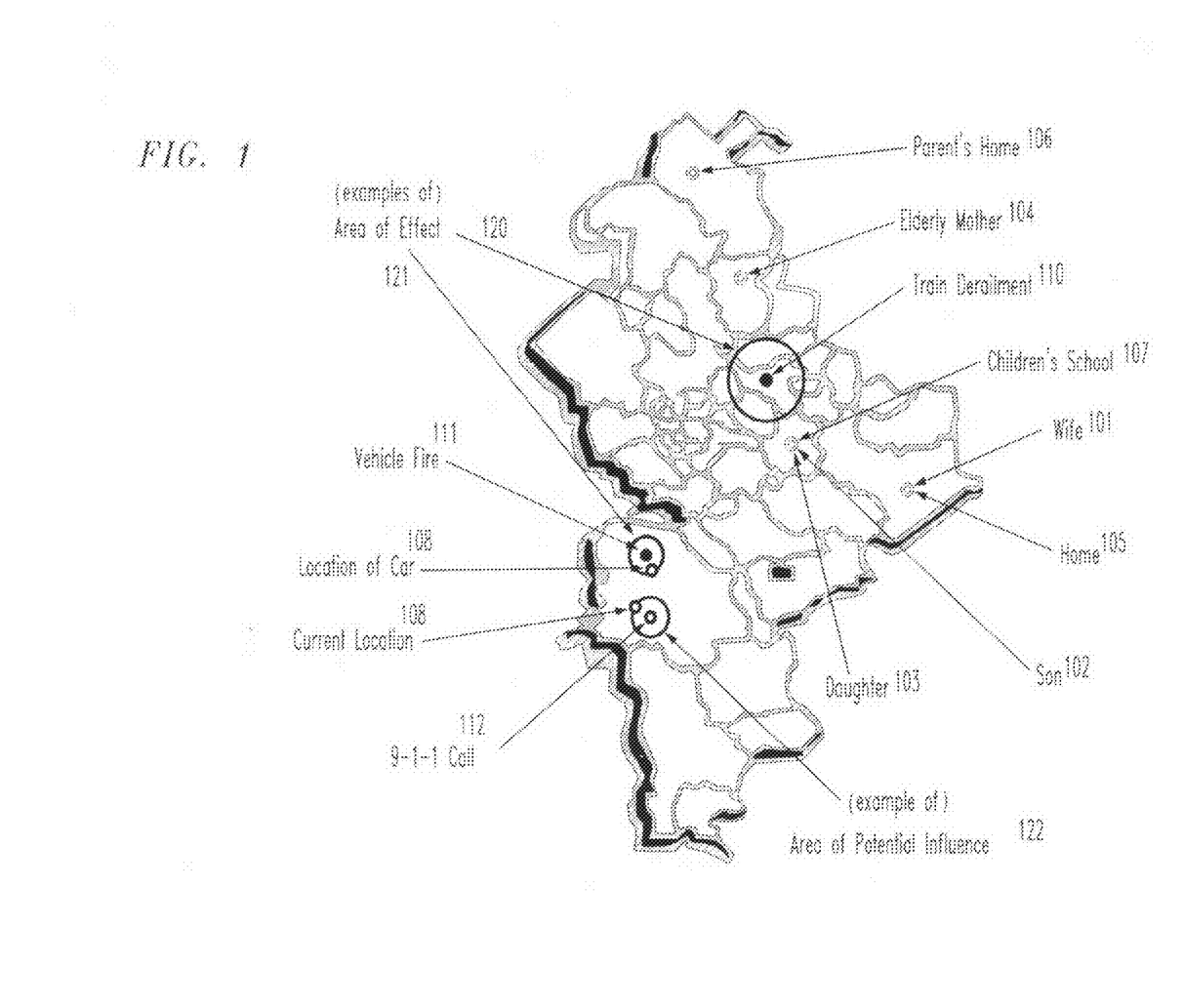
FIG. 1 depicts the function of an exemplary sentinel service provided by the iAlert_Enhanced_Alert_Manager, in accordance with the principles of the present invention.

FIG. 1 depicts the function of an exemplary sentinel service provided by the iAlert_Enhanced_Alert_Manager, in accordance with the principles of the present invention.

In particular, FIG. 1 illustrates nine (9) different persons, places, or things in which one iAlert subscribing wireless device has advertised an interest, as well as three (3) different events about which the iAlert subscribing wireless device may want to be notified.

In the example depicted in FIG. 1, the iAlert subscribing wireless device has registered an interest in their own wireless device 100, their spouse's wireless device 101, their son's wireless device 102, their daughter's wireless device 103, their mother's wireless device 104, their home's location 105, their parents' home's location 106, their children's school's location 107, and their car wireless device 108.

Moreover, the example in FIG. 1 also depicts three (3) exemplary events the iAlert subscribing wireless device may be notified about. Exemplary potential events of interest include a train derailment 110 with a declared 3-square block evacuation area 120, a vehicle fire 111 with a 200 foot area of effect 121, and a 9-1-1 call in-progress with a declared 200 foot area of potential influence 122, inside which a medical first responder or good Samaritan could provide timely cardio-pulmonary resuscitation (CPR) to the heart attack victim who has dialed 9-1-1.

In the example depicted in FIG. 1, the magnitude of the train derailment 120 is not big enough to encompass any of the nine (9) persons/places/things in which the iAlert subscribing wireless device has registered an interest. Thus, the train derailment is not considered a threat and a notification is not sent to the iAlert subscribing wireless device.

The area of potential influence 122 associated with the 9-1-1 call in-progress, in the example depicted in FIG. 1, is big enough to encompass the iAlert subscribing wireless device's current location 100. Though, the subscriber who owns the iAlert registered wireless device has declared neither an affinity for "medical first responder" nor an affinity for "good samaritanism" so a notification is not sent to the iAlert registered wireless device.

The area of effect associated with the vehicle fire 111, in the example depicted in FIG. 1, encompasses the location that the iAlert subscriber has recorded for their car 108. The iAlert subscriber would certainly like to be made aware of this event, so a notification is sent to the iAlert subscribing wireless device.

Facilitation of the type of notification sent to an iAlert subscriber regarding a particular event/happenstance depends upon whether the iAlert sentinel pertains to a person, place, or thing.

In a somewhat inverted view of the universe, a mobile device defines a Sphere of Influence (SPIN) through which a multitude of planes of interaction pass and occasionally intersect. The intersection of planes of interaction within a wireless device's sphere of influence constitutes a confluence of affinity that may either positively induce a person (attractive inducement) or negatively induce a person (repulsive inducement).

Due to the varied nature of inducements, in accordance with the present invention, sentinels for persons depend upon a Sphere of Influence (SPIN) table, an AffinityList table, and an Affinity table to determine the precise nature of any notifications to be sent.

Figure 2:
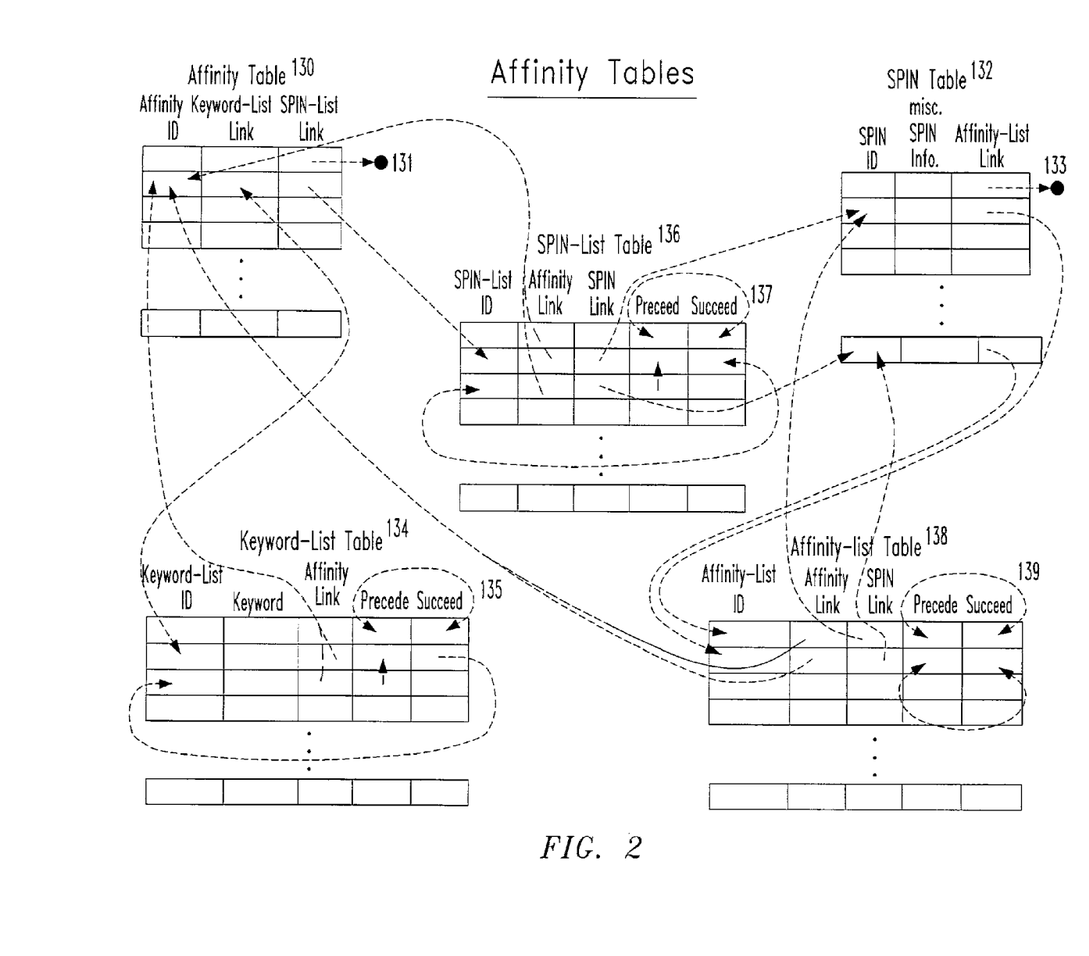
FIG. 2 depicts five (5) exemplary data structures with which to manage affinities, SPINs, and the identification of relationships therebetween.

FIG. 2 depicts five (5) exemplary data structures with which to manage affinities, SPINs, and the identification of relationships therebetween.

In the example illustrated in FIG. 2, all affinities are maintained using two (2) specific data structures: an Affinity Table 130, and a Keyword-List Table 134.

All participating SPINs are maintained using one (1) primary data structure: a SPIN Table 132.

The relationship between affinities and SPINs is managed using, e.g., two (2) additional data structures: a SPIN-List Table 136, and an Affinity-List Table 138.

Each record or row in the Affinity Table 130 includes, but is not limited to, an Affinity ID (i.e. the primary key), a Keyword-List Link, and a SPIN-List Link. In the given example, every defined Affinity must have at least one Keyword-List entry (i.e. at least one keyword) with which to uniquely identify the Affinity. Keyword-List Link fields are preferably not allowed to be set to a TERMINATOR value. Affinities that are defined but have zero (0) associated SPINs must set the SPIN-List Link for the Affinity to a TERMINATOR value 131.

Note that in this description the word "Link" is used to denote any reference/dereference mechanism used to access information from a data structure other than the data structure in which the Link resides.

Each record or row in the Keyword-List Table 134 includes, but is not limited to, a Keyword-List ID (i.e. the primary key), a Keyword, an Affinity Link, and two (2) Keyword-List Link values, PRECEDE and SUCCEED. PRECEDE and SUCCEED are two (2) Keyword-List Link values used to create a doubly-linked list of the keywords that serve to uniquely identify an Affinity.

The Keyword field of a Keyword-List entry may be set to any representation of a keyword except the null or empty set. The Affinity Link field of a Keyword-List entry must refer back to one and only one associated Affinity Table entry. Affinity Link fields are not allowed to be set to a TERMINATOR value. The PRECEDE and SUCCEED fields of a Keyword-List entry are also not to be set to a TERMINATOR value. The PRECEDE and SUCCEED fields must always refer to an entry in the Keyword-List Table. Keyword-Lists that are comprised of one and only one (1) keyword will set the values of both PRECEDE and SUCCEED to refer to the sole Keyword-List entry in the table. Thus, in a Keyword-List Table comprising of only one entry, PRECEDE and SUCCEED values refer to or point to one another 135.

Every participating SPhere of INfluence (SPIN) in the present invention is represented by one (1) and only one entry in the SPIN Table 132. Each record or row in the SPIN Table 132 includes, but is not limited to, a SPIN ID (i.e. the primary key), miscellaneous SPIN information, and an Affinity-List Link. Miscellaneous SPIN information may be a multitude of sub-fields, some of which may actually refer to other data structures or other data sources entirely. Participating SPINs for which zero (0) affinities have been identified, must set the Affinity-List Link value for the SPIN to a TERMINATOR value 133.

Relationship or association between Affinities and SPINs is managed using both the SPIN-List Table 136 and the Affinity-List Table 138. The SPIN-List Table 136 is intended to permit a device to start with one (1) entry in the Affinity Table and find all SPINs associated with that Affinity. Alternatively, the Affinity-List Table is intended to permit a device to start with one (1) entry in the SPIN Table and find all Affinities associated with that SPIN.

Each record or row in the SPIN-List Table 136 includes, but is not limited to, a SPIN-List ID (i.e. the primary key), an Affinity Link, a SPIN Link, and two (2) SPIN-List link values, PRECEDE and SUCCEED. PRECEDE and SUCCEED are two (2) SPIN-List link values used to create a doubly-linked list of SPINs associated with an Affinity. The Affinity Link and SPIN Link fields are not allowed to be set to a TERMINATOR value. Entries in the SPIN-List Table are only created when a relationship between an Affinity and a SPIN is created. Thus, there is always both a reference to an Affinity as well as a reference to a SPIN in the SPIN-List Table. PRECEDE and SUCCEED fields must always refer to an entry in the SPIN-List Table. SPIN-Lists that are comprised of one and only one (1) SPIN, set the values of both PRECEDE and SUCCEED to refer to the sole entry in the SPIN-List table. Thus, in a SPIN-List Table comprising of only one entry, PRECEDE and SUCCEED values refer to or point to one another 137.

Each record or row in the Affinity-List Table 138 includes, but is not limited to, an Affinity-List ID (i.e. the primary key), an Affinity Link, a SPIN Link, and two (2) Affinity-List link values, SUCCEED and PRECEDE. Affinity-List link values SUCCEED and PRECEDE are used to create a doubly-linked list of the Affinities associated with a particular SPIN. The Affinity Link and SPIN Link fields are preferably not allowed to be set to a TERMINATOR value. Entries in the Affinity-List Table are only created when a relationship between an Affinity and a SPIN is created. Thus, there is always both a reference to an Affinity as well as a reference to a SPIN in an Affinity-List table. PRECEDE and SUCCEED fields must always refer to an entry in the Affinity-List Table. Affinity-Lists that are comprised of one and only one (1) Affinity, set the values of both PRECEDE and SUCCEED to refer to the sole entry in the Affinity-List table. Thus, in an Affinity-List Table comprised of only one entry, PRECEDE and SUCCEED values refer to or point to one another 139.

Definition and activation of the sentinel service provided by the iAlert_Enhanced_Alert_Manager, on a person, place, or thing, initiates the computation of two (2) or more vectors. Such vectors, for the purposes of this invention, shall hereafter be referred to as iEvent-vectors and iAlert-vectors. iEvent-vectors and iAlert-vectors are specifically meant to provide the basis for timely notification of relevant events and happenstance.

Facilitation of the type of notification sent when an iEvent-vector exceeds the threshold setting of an iAlert-vector depends upon whether the iAlert sentinel pertains to a person, place, or thing. Sentinels set on places and things will only generate notifications pertaining to threat events (i.e. repulsive inducements). Sentinels set on persons are more dynamic and might actually result in notifications intended to direct a person toward an event rather than away from it.

Figure 3:
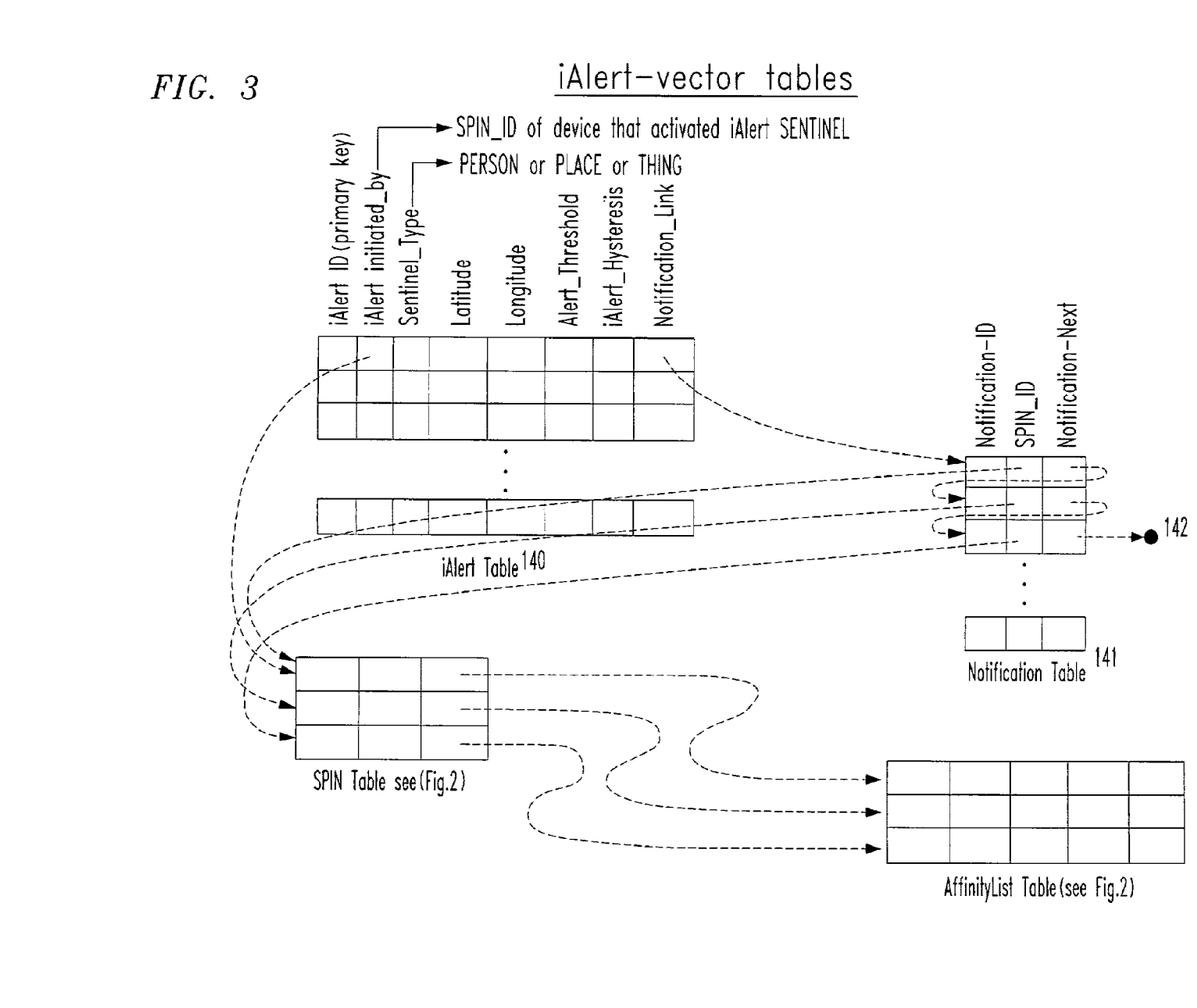
FIG. 3 depicts two (2) exemplary data structures with which to manage iAlert-vectors and the notifications that are the ultimate purpose of the iAlert-vector, in accordance with the principles of the present invention.

FIG. 3 depicts two (2) exemplary data structures with which to manage iAlert-vectors and the notifications that are the ultimate purpose of the iAlert-vector.

In the example illustrated in FIG. 3, all iAlert-vectors are maintained using data in two (2) tables: an iAlert Table 140 and a Notification Table 141.

Each row in the iAlert table 140 includes, but is not limited to, the following fields: iAlert_ID (i.e. the primary key), iAlert_initiated_by, Sentinel Type, Latitude, Longitude, iAlertThreshold, iAlert_Hysteresis, and Notification_Link. The iAlert_initiated_by field is a SPIN_ID value with which an entire row in the SPIN table 132 may be isolated. The iAlert_initiated_by field records the device that established the iAlert sentinel. A Sentinel Type field records whether the relevant iAlert pertains to a PERSON, PLACE, or THING. An iAlert_Threshold value denotes the base iEvent MAGNITUDE required to stimulate transmission of a notification. Additionally, an iAlert_Hysteresis value is used to prevent notification stutter pertaining to a particular event/happenstance. Once notification of an event has been transmitted, an "Event Concluded" notification, indicating the conclusion of an event, is not transmitted until the iEvent MAGNITUDE has been reduced to a value less than the difference between the iAlert_Threshold value and the iAlert_Hysteresis value (i.e. "iAlert_Threshold iAlert_Hysteresis"). Thus, use of the iAlert_Hysteresis value prevents a barrage of event notifications and "Event Concluded" transmissions, should the event MAGNITUDE flutter, slightly above and below the iAlert_Threshold value. Notification_Link fields are not allowed to be set to a TERMINATOR value, considering the primary reason to activate an iAlert sentinel is to receive some sort of notification, stimulated by an iEvent. Hence, there must always be at least one record in the Notification Table 141 for every record present in the iAlert Table 140. There may, however, be more than one record in the Notification Table 141 associated with a single record in the iAlert Table 140.

Each row in the Notification Table 141 includes, but is not limited to, a Notification_ID (i.e. the primary key), a SPIN_ID, and a Notification_Next Link. The SPIN ID field represents the device to which notifications shall be transmitted. The Notification_Next link value is used to identify the next device to which to transmit a notification. This linked list structure in the Notification Table allows a single sentinel detection to result in notification transmissions to multiple recipients. There will always be at least one row in the Notification Table for every row in the iAlert Table. The last row in a linked list of notification records associated with a single iAlert record will set the Notification_Next link value to a TERMINATOR value 142 to represent the end of the linked list.

This invention presumes that iAlert sentinels established for PLACEs and/or THINGs are intended to provide repulsive inducement. Repulsive inducements are transmitted to issue a warning on a wireless device that has activated a sentinel, so that the user of this wireless device may attempt to prevent or avoid negative effect to the PLACE or the THING that a notification is referring to, including but not limited to theft and/or damage.

This invention further presumes that iAlert sentinels established for PERSONs are intended to take full advantage of all facets of the Affinity Table (see FIG. 2) including, but not limited to, all attractive and repulsive inducements identified via the Affinity List and uniquely associated with the device that activated the iAlert sentinel upon the PERSON (i.e. iAlert_initiated_by).

In the example depicted in FIG. 3, an iAlert-vector is comprised of a single iAlert Table record, which is linked to three (3) Notification Table records. The device that activated the sentinel for the iAlert-vector in the example depicted in FIG. 3, is named as one of the three notification recipients. Therefore, the iAlert_initiated_by field in the iAlert Table record and the first Notification record in the notification linked list both link to the same SPIN Table record. The second and third Notification records in the notification linked list, link to different SPIN Table records.

Were the sentinel in the iAlert-vector providing overwatch for a PERSON, then the AffinityList indicated in the SPIN table would be dereferenced for all SPINs referenced by the notification linked list, such that any and all iEvents associated with the list of affinities for each SPIN would be evaluated for possible transmission of notification(s).

Figure 4:
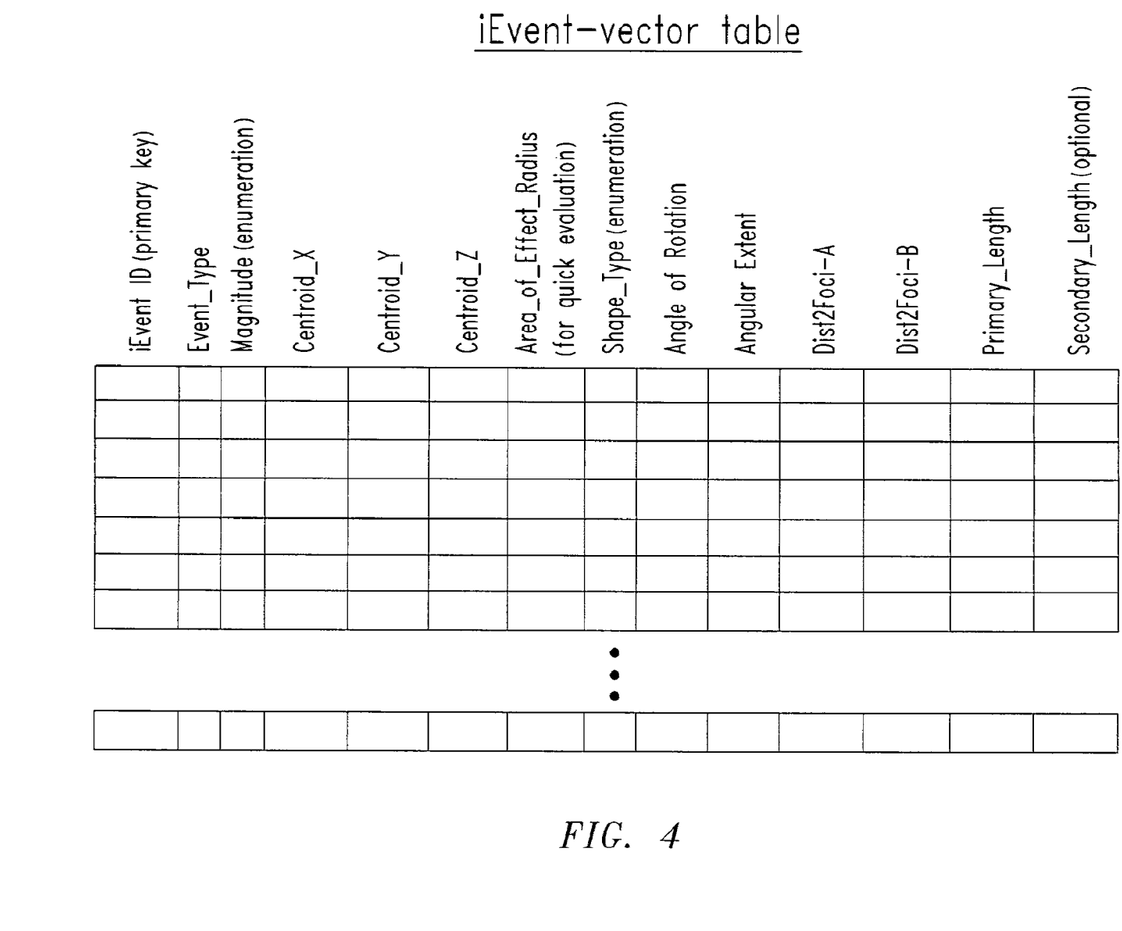
FIG. 4 depicts one (1) exemplary data structure with which to manage iEvent-vectors, in accordance with the principles of the present invention.

FIG. 4 depicts one (1) exemplary data structure with which to manage iEvent-vectors, in accordance with the principles of the present invention.

Each row in an iEvent-vector table is used to assess a particular event of interest and includes, but is not limited to, the following fields: iEvent_ID (i.e. the primary key), Event Type, Magnitude, Centroid X, Centroid_Y, Centroid_Z, Area_of Effect Radius, Shape_Type, Angle_of Rotation, Angular_Extent, Dist2Foci-A, Dist2Foci-B, Primary_Length and Secondary_Length. The Event_Type and Magnitude fields are both used to assess and determine notifications that are relevant to a particular iEvent. Centroid_X, Centroid_Y, and Centroid_Z fields encompass three (3) coordinates used to record the center of an event. The Area of Effect Radius is a radius value that indicates the general area of effect and provides very rapid assessment as to whether further analysis of the event is necessary. If the central point and radius of the iEvent-vector does not encompass the location of an iAlert-vector, then notification is not merited. The Shape_Type enumerated field includes but is not limited to the following values: POINT, CIRCLE, ELLIPSE, ARC, and ARC_BAND. The Angle_of_Rotation value is measured from true North. The Angular_Extent field is used to assess ARCs and ARC_BANDs. The Distance to Foci A (i.e. Dist2Foci-A) and Distance to Foci B (i.e. Dist2Foci-B) values designate the Foci of an ellipse measured from the Centroid. The Primary_Length and Secondary_Length values represent either the Major and Minor Axes lengths for an ellipse or the inner and outer radius values for ARCs and ARC_BANDs.

The present invention includes but is not limited to three (3) different action types for iEvent-vectors: INITIATE, UPDATE, and CLEAR.

The INITIATE action causes a new row to be allocated to an iEvent-vector table. A new row in an iEvent-vector table preferably must include Event_Type, Magnitude, Centroid location, estimated Area_of_Effect_Radius, Shape_Type, and measurements necessary to define the shape indicated in the Shape_Type field. Declaration of an INITIATE action will stimulate the evaluation of iAlert-vectors within the area of effect for potential transmission of notifications.

An UPDATE action preferably must designate the iEvent_ID of the specific iEvent-vector being updated and then may include some subset of the following parameters: Magnitude, Centroid location, Area_of_Effect_Radius, Shape_Type and all measurements necessary to define the particular shape indicated in the Shape_Type field. UPDATE actions may not change Event_Type. Declaration of an UPDATE action will stimulate evaluation of all iAlert-vectors within the area of effect as well as all iAlert-vectors that have previously resulted in the transmission of a notification. iAlert-vectors for which notifications were previously sent, but are no longer within the area of effect, will receive an "Event Concluded" notification. A CLEAR action must designate the iEvent_ID of the specific iEvent-vector being canceled and will force "Event Concluded" notifications to be sent to all recipients of iAlert-vector notifications. The CLEAR action will delete the iEvent-vector row associated with the designated iEvent ID value.

Another embodiment of the present invention uses a GeoNEXUS. When an iEvent-vector is INITIATED, UPDATED, or CLEARED, the GeoNEXUS determines which iAlert-vectors are within close enough proximity to the iEvent-vector to be evaluated for possible notification. For the purposes of this embodiment the proximity evaluation is designed for speed of performance during proximity evaluation processing.

Figure 5:
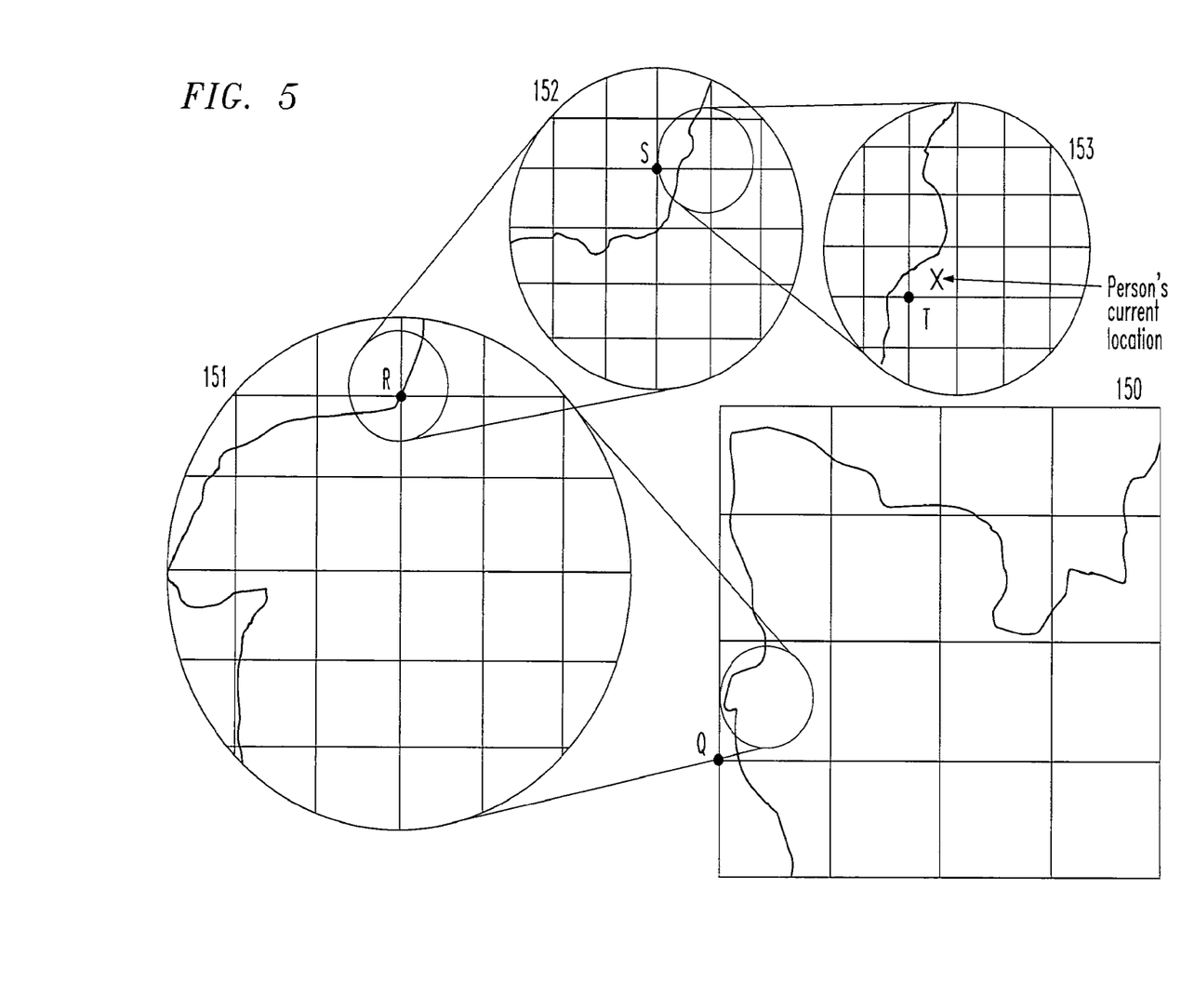
FIG. 5 depicts a wireless device user's location, in accordance with the principles of the present invention.

FIG. 5 depicts a wireless device user's location, in accordance with the principles of the present invention.

In particular, as shown in FIG. 5, the present invention reduces the location of an iAlert-vector or iEvent-vector, represented, e.g., in decimal degrees of latitude and longitude, into indices of latitude and indices of longitude within four (4) layers: 1) Primary 150: tens of degrees (~700 statute mile resolution); 2) Secondary 151: degrees (~70 statute mile resolution); 3) Tertiary 152: minutes (6000 foot resolution); and 4) Quaternary 153: seconds (~100 foot resolution). This implementation figuratively covers the Earth's surface with successively finer grained gridlines. Seconds of latitude and longitude yield a grid whose vertices are approximately 100 feet apart at the equator and somewhat closer together the farther away from the equator (North or South) the device is located.

Should the need arise to attain even finer granularity than seconds, a fifth (Quinary) and even sixth (Senary) layer may be added to represent 10ths of seconds (~10 feet) and 100ths of seconds (~12 inches).

Every time a location is registered, the GeoNEXUS will save the associated identifier, location (latitude and longitude), and optimization indices in a LOC table.

Figure 6:
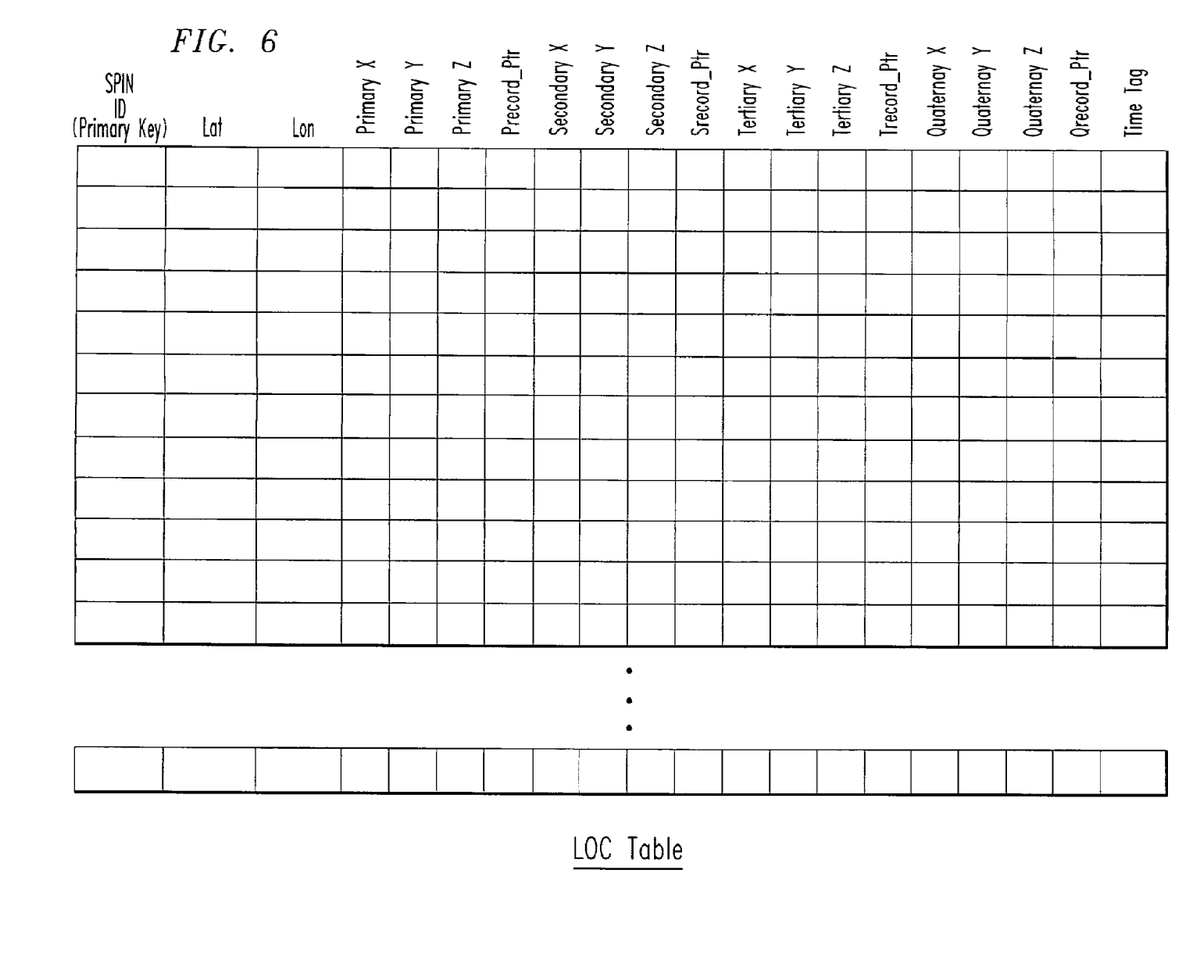
FIG. 6 shows an exemplary location (LOC) table, in accordance with the principles of the present invention.

FIG. 6 shows an exemplary location (LOC) table, in accordance with the principles of the present invention.

In particular, as shown in FIG. 6, the Lat and Lon values are normalized to be decimal degrees in the range −90.0 through +90.0 for Latitude and −180.0 through +180.0 for Longitude. The indices are computed thusly:

$$PrimaryX=\text{int}(\text{round}((Lon/10.0)-0.5))$$

$$PrimaryY=\text{int}(\text{round}((Lat/10.0)-0.5))$$

$$PrimaryZ=\text{Altitude modulo 700 statute miles}$$

$$SecondaryX=\text{int}(\text{truncate}(Lon-(PrimaryX*10.0)))$$

$$SecondaryY=\text{int}(\text{truncate}(Lat-(PrimaryY*10.0)))$$

$$SecondaryZ=\text{Altitude modulo 70 statute miles}$$

$$TertiaryX=\text{int}(\text{truncate}((Lon-((PrimaryX*10.0)+SecondaryX))*60.0))$$

$$TertiaryY=\text{int}(\text{truncate}((Lat-((PrimaryY*10.0)+SecondaryY))*60.0))$$

$$TertiaryZ=\text{Altitude modulo 6000 feet}$$

$$QuaternaryX=\text{int}(\text{truncate}((Lon-((PrimaryX*10.0)+SecondaryX+(TertiaryX/60.0)))*3600.0))$$

$$QuaternaryY=\text{int}(\text{truncate}((Lat-((PrimaryY*10.0)+SecondaryY+(TertiaryY/60.0)))*3600.0))$$

$$QuaternaryZ=\text{Altitude modulo 100 feet}$$

Note that these equations presume that the round ( ) function always rounds an "n.5" value up so that 0.5 becomes 1.0, 2.5 becomes 3.0, −3.5 becomes −3.0, etc. Some adjustments may be necessary to accommodate specific hardware architectures, operating systems, and compilers, as will be appreciated by those of skill in the art.

The intent, though, is to compute an index based on the lower left corner of the square in which the iAlert-vector/iEvent-vector is located. The Primary square (See 'Q' in FIG. 5) is a 10 degree by 10 degree square. The Secondary square (See 'R' in FIG. 5) is a one degree by one degree square located within the Primary. The Tertiary square (See 'S' in FIG. 5) is a one minute by one minute square located within the Secondary. The Quaternary square (See 'T' in FIG. 5) is a one second by one second square located within the Tertiary.

These computations produce values in the following ranges: $-18<=PrimaryX<=18$ $-9<=PrimaryY<=9$ $-1<=PrimaryZ<=36$ $0<=SecondaryX<=9$ $0<=SecondaryY<=9$ $-1<=SecondaryZ<=357$ $0<=TertiaryX<=60$ $0<=TertiaryY<=60$ $-1<=TertiaryZ<=22,000$ $0<=QuaternaryX<=60$ $0<=QuaternaryY<=60$ $-3<=QuaternaryZ<=1.32e06$ FIG. 7 shows an exemplary primary matrix, in accordance with the principles of the present invention.

Figure 7:
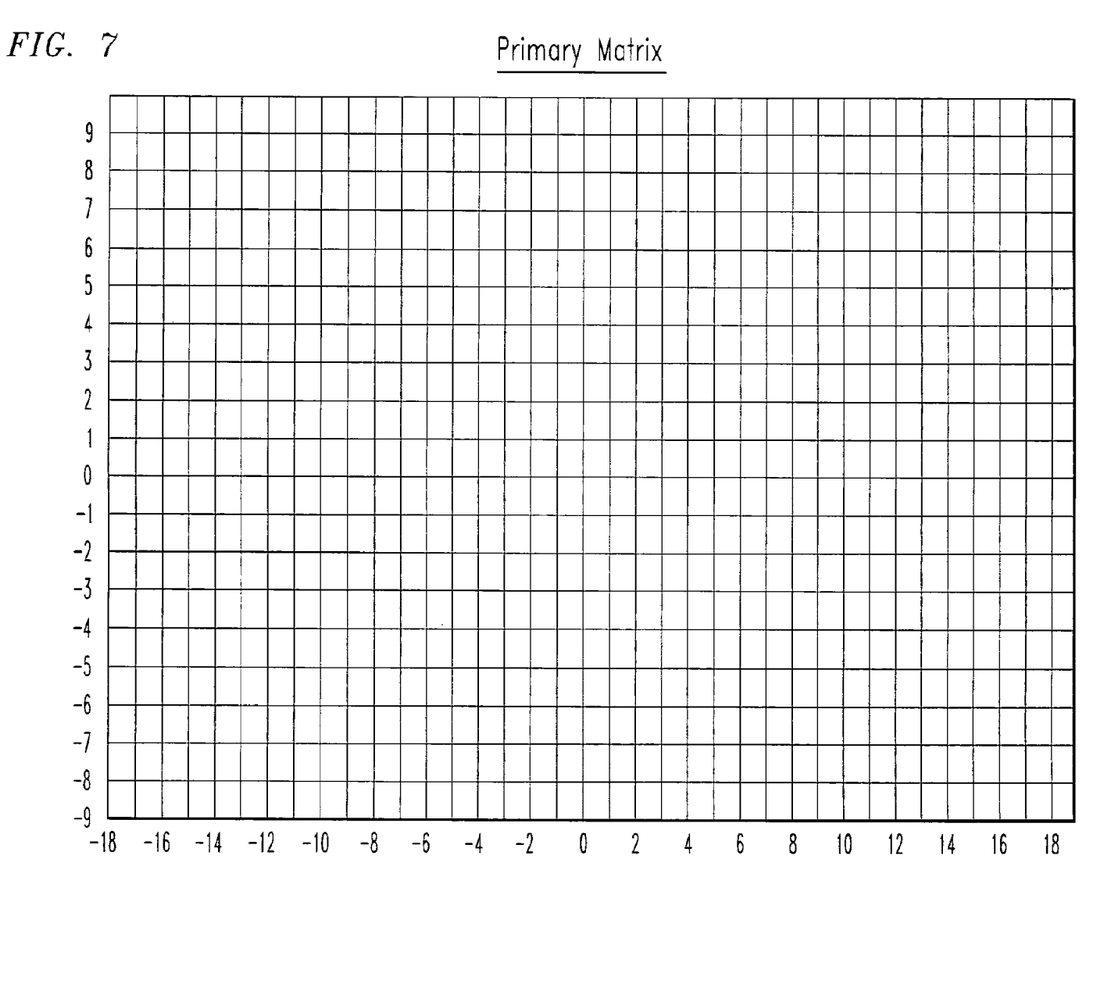
FIG. 7 shows an exemplary primary matrix, in accordance with the principles of the present invention.

In particular, as shown in the primary matrix of FIG. 7, the GeoNEXUS maintains a collection of matrices. This collection of matrices always includes a matrix for the Primary indices (i.e. a "Primary Matrix").

The primary matrix is accompanied by a PrimaryCount indicating how many iAlert-vectors/iEvent-vectors are present.

The Primary Matrix is also accompanied by an array or list of the primary matrix elements in which iAlert-vectors/iEvent-vectors can be found. (The list is empty if PrimaryCount is zero.)

Each element in the 36×18 Primary matrix contains: (1) a count of how many iAlert-vectors/iEvent-vectors are present in the corresponding 10 deg X 10 deg area; and (2) a reference to a Secondary Matrix. (The reference is NULL if count is zero). Secondary (10×10 matrix), Tertiary (60×60), and Quaternary (60×60) matrices are allocated, maintained, and eliminated as needed to manage GeoNEXUS memory use.

Each Secondary Matrix is accompanied by a SecondaryCount indicating how many iAlert-vectors/iEvent-vectors are present in the corresponding 10 deg×10 deg area.

Each Secondary Matrix is also accompanied by an array or list of the secondary matrix elements in which iAlert-vectors/iEvent-vectors can be found. (The list is empty if its SecondaryCount is zero.)

Each element in a 10×10 Secondary matrix contains: (1) a count of how many iAlert-vectors/iEvent-vectors are present in that particular 1 deg×1 deg area; and (2) a reference to a Tertiary Matrix. (The reference will be NULL if the count is zero.)

Each Tertiary Matrix is accompanied by a TertiaryCount indicating how many iAlert-vectors/iEvent-vectors are present in the corresponding 1 deg×1 deg area.

Each Tertiary Matrix is also accompanied by an array or list of the tertiary matrix elements in which iAlert-vectors/iEvent-vectors can be found. (The list is empty if its TertiaryCount is zero.)

Each element in a 60×60 Tertiary matrix contains: (1) a count of how many iAlert-vectors/iEvent-vectors are present in that particular 1minute X 1minute area; and (2) a reference to a Quaternary Matrix. (The reference is NULL if count is zero.)

Each Quaternary Matrix is accompanied by a QuaternaryCount indicating how many iAlert-vectors/iEvent-vectors are present in the corresponding 1min×1min area.

Each Quaternary Matrix is also accompanied by an array or list of the quaternary elements in which iAlert-vectors/iEvent-vectors can be found. (The list is empty if QuaternaryCount is zero.)

Each element in a 60×60 Quaternary matrix contains: (1) a count of how many iAlert-vectors/iEvent-vectors are present in that particular 1second×1second area; and (2) an array or list of iAlert-vectors/iEvent-vectors Identifiers that are present in the corresponding 1sec×1sec area. (The list is empty if count is zero.)

The evaluation of 'Z' axis differences are preferably not managed in a matrix structure but rather are evaluated in near real-time as a simple difference of like Z values (i.e. primary, secondary, tertiary, etc.). If the absolute value of the computed Z-difference (i.e. delta Z) is within the defined vertical bounds of proximity, then proximity has been successfully established.

Maintenance of this four (4) tier structure is complex but considered obvious to those skilled in data structures and is not described further in this disclosure.

This four (4) tier data structure makes it possible for the GeoNEXUS to rapidly identify all of the iAlert-vectors in a predefined or preconfigured close proximity to an iEvent-vector so that evaluation of notifications can be resolved in a timely manner.

Once the proximity of iEvent-vectors to iAlert-vectors has been established, it is a simple matter to evaluate the Magnitude value in the iEvent-vector versus the Alert_Threshold value in the iAlert-vector. Evaluation of the iAlert-vector versus the iEvent-vector determines whether or not it is necessary to cycle through Notification records associated with the iAlert-vector to transmit the appropriate form of notification to the intended recipient.

The iAlert-Hysteresis value of the iAlert-vector is used with both the Magnitude of the iEvent-vector and the juxtaposition of location between the iEvent-vector and the iAlert-vector (i.e. proximity). Use of the iAlert_Hysteresis value prevents small fluxuations in the parameters of the iEvent-vector from pummeling recipients with a barrage of notifications. The value for the iAlert_Hysteresis is chosen by the user who established the iAlert sentinel, however, so the frequency of notification to the intended recipients varies from iAlert-vector to iAlert-vector.

While the invention has been described with reference to the exemplary embodiments thereof, those skilled in the art will be able to make various modifications to the described embodiments of the invention without departing from the true spirit and scope of the invention.

What is claimed is:

1. A method of providing notification to a wireless device regarding an effect from an event distant from said wireless device but having an area of effect about which a user of said wireless device has interest, comprising:
   obtaining at least one affinity established for notification to a given wireless device;
   defining a sphere of influence (SPIN) about a given event distant from said wireless device;
   recognizing a relationship between said at least one affinity and said sphere of influence with a match between said at least one affinity and said sphere of influence; and
   initiating a relevant notification to said given wireless device.

2. The method of providing notification to said wireless device regarding an effect from an event distant from said wireless device but having an area of effect about which a user of said wireless device has interest according to claim 1, further comprising:
   providing clarifying information to said wireless device relating to circumstances about said event distant from said wireless device.

3. The method of providing notification to said wireless device regarding an effect from an event distant from said wireless device but having an area of effect about which a user of said wireless device has interest according to claim 1, wherein:
   an effect on said user of said wireless device is indirect to effects due to said given event.

4. The method of providing notification to said wireless device regarding an effect from an event distant from said wireless device but having an area of effect about which a user of said wireless device has interest according to claim 1, wherein:
   said given event is distant to said wireless device but proximate to a wireless device relating to another whom said user of said wireless device has a predefined interest.

5. The method of providing notification to said wireless device regarding an effect from an event distant from said wireless device but having an area of effect about which a user of said wireless device has interest according to claim 1, wherein:
   said given event is proximate to a distant location about which said user of said wireless device has a predefined interest.

6. The method of providing notification to said wireless device regarding an effect from an event distant from said wireless device but having an area of effect about which a user of said wireless device has interest according to claim 1, wherein:
   said relationship between said at least one affinity and said sphere of influence is determined using a keyword-list database.

7. The method of providing notification to said wireless device regarding an effect from an event distant from said wireless device but having an area of effect about which a user of said wireless device has interest according to claim 1, wherein:
   said relationship between said at least one affinity and said sphere of influence is determined using an affinity-list database.

8. The method of providing notification to said wireless device regarding an effect from an event distant from said wireless device but having an area of effect about which a user of said wireless device has interest according to claim 1, wherein:
   said relationship between said at least one affinity and said sphere of influence is determined using a spin-list database.

* * * * *